(12) United States Patent
Dron

(10) Patent No.: US 6,677,020 B2
(45) Date of Patent: Jan. 13, 2004

(54) AUTOMOBILE NOVEL SEALING JOINT FOR A MOTOR VEHICLE BODY OPENING FRAME

(75) Inventor: Bernard Dron, Puteaux (FR)

(73) Assignee: BTR Sealing Systems France, Nanterre (FR)

( * ) Notice: Subject to any disclaimer, the term of this patent is extended or adjusted under 35 U.S.C. 154(b) by 0 days.

(21) Appl. No.: 09/980,142
(22) PCT Filed: Mar. 29, 2001
(86) PCT No.: PCT/FR01/00950
§ 371 (c)(1), (2), (4) Date: Apr. 29, 2002
(87) PCT Pub. No.: WO01/74616
PCT Pub. Date: Oct. 11, 2001

(65) Prior Publication Data
US 2002/0155253 A1 Oct. 24, 2002

(30) Foreign Application Priority Data
Mar. 31, 2000 (FR) .............................. 00 04114

(51) Int. Cl.⁷ ................................. B32B 1/08
(52) U.S. Cl. .................. 428/36.91; 428/36.9; 428/122; 49/490.1; 49/498.1
(58) Field of Search ................. 428/122, 36.9, 428/36.91; 49/490.1, 498.1, 495.1, 484.1

(56) References Cited

U.S. PATENT DOCUMENTS 3,378,956 A * 4/1968 Parks et al. ............... 49/490.1
3,952,455 A * 4/1976 McAlarney ............... 49/490.1

FOREIGN PATENT DOCUMENTS

| EP | 0 613 800 A1 | 9/1994 |
| EP | 0 622 261 A1 | 11/1994 |
| FR | 2 793 196 A1 | 11/2000 |
| WO | WO 98/21061 | 5/1998 |

* cited by examiner

Primary Examiner—Alexander S. Thomas
(74) Attorney, Agent, or Firm—Scully, Scott, Murphy & Presser

(57) ABSTRACT

The invention concerns a joint wherein inside the second extruded profile (5) and along part at least of the length thereof is housed a third extruded profile (7), with U-shaped cross-section, of reduced dimensions compared to those of the second extruded profile (5) and whereof the ends of the branches are also adjacent to the same wing or at the base of the first extruded profile (1), said third extruded profile (7) being likewise made of an elastically deformable material and being designed to counter local resistance to compressive effort exerted by the opening, while reinforcing sealing and soundproof conditions at the opening frame.

11 Claims, 2 Drawing Sheets

AUTOMOBILE NOVEL SEALING JOINT FOR A MOTOR VEHICLE BODY OPENING FRAME

The present invention relates to a seal for the surround of an opening in motor vehicle bodywork, particularly the surround of a trunk, tailgate, quarter light, door or the like.

Such seals for surrounds generally comprise:

a section piece forming a clip with a U-shaped cross section, made of elastomer or of plastomer, usually including a rigid armature and intended to sit over and clip onto part of the surround of the opening in the motor vehicle bodywork, or a similar means of attachment to this surround;

and at least one tubular section piece made of an elastically deformable material, generally a cellular material, abutting, for example, a lateral branch or the base of the U-shaped section piece and projecting toward the outside from the surround of the opening, with a view to being compressed between the opening leaf and the surround, when the opening leaf is in the closed position, so as to seal the vehicle.

The U-shaped section piece and the tubular section piece are customarily made of thermoplastic or elastomeric materials and are produced by co-extrusion.

Aside from its sealing role, when compressed by the opening leaf when the latter is in the closed position, the tubular section piece also has a function of soundproofing the cabin of the vehicle.

Numerous forms of embodiment of such seals are known in the state of the art and all are generally aimed at improving their soundproofing properties, without detracting too greatly from the ability of the tubular section piece to deform.

The present invention relates to seals of the same general type but which, unlike those of the prior art, which were aimed at having excellent ability to deform, here locally put up greater resistance to deformation, under the influence of the opening leaf, when the latter is being closed.

Specifically, when motor vehicle doors are highly curved, they tend to deform as the vehicle runs along at high speed, under the effect of an external depression, and it is important to be able to oppose this deformation. With a seal which puts up greater resistance to the closing of the doors, these doors, having been closed, are preloaded, which allows them better to resist the external stresses when the vehicle is moving along at high speed.

Furthermore, with certain vehicle trunks, it is sometimes necessary that, when closing the opening leaf, the trunk seal at least locally puts up sufficient resistance to this to act as an end-of-travel damper, thus avoiding vibration occurring later.

The invention relates to a seal for a surround of an opening of a motor vehicle, which meets the requirements which have just been mentioned.

To this end, the subject of the invention is a seal for the surround of an opening in motor vehicle bodywork, this seal comprising a first section piece forming a clip of U-shaped cross section, made of elastomer or of plastomer, capable of sitting over and gripping a projecting part of the surround of the opening, and a second section piece of U-shaped cross section, made of an elastically deformable material, arranged to the side of the first section piece, with the ends of its branches abutting one of the flanges or the base of this first section piece, so as to form, with this flange, a tubular member, this second section piece comprising at least one orifice placing the inside of the section piece in communication with the outside and intended to be compressed elastically by the opening leaf associated with the opening in the bodywork, when this opening leaf is in the closed position, so as to seal at the surround, this seal being characterized in that, housed inside the second section piece and along at least part of its length, is a third section piece with a U-shaped cross section, which is smaller in size than the second section piece and the ends of the branches of which also abut the same flange or the base of the first section piece, this third section piece also being made of an elastically deformable material and intended to put up local resistance to the compressive force exerted by the opening leaf, while at the same time improving the sealing and soundproofing at the surround of the opening.

Like the second section piece, the third section piece may be pierced with at least one orifice placing the inside of this section piece in communication with its outside. It may also have no such orifice, for certain applications of the seal.

The third section piece of the seal according to the invention therefore has a three-fold function:

to put up greater resistance to the closing of the opening leaf;

to act as an end-of-travel damper for this opening leaf, when the latter reaches its closed position;

to oppose the passage of sound waves and thus better soundproof the cabin of the vehicle, when compressed by the opening leaf.

Depending on the importance attached by the vehicle manufacturer to any one of these functions, the third section piece may therefore extend only over part of the length of the second section piece which acts as a seal, or over the entire length thereof.

In order to improve the soundproofing qualities of this seal, the second and/or third section pieces may be locally sheathed with at least one flexible film made of a material different than the one of which they are made, or from similar material, but having different physical properties, this or these films extending only over part of the cross section and possibly over part of the length of the associated section piece, as described in French Patent Application No. 00 01655, filed on Feb. 10, 2000 and not published at the date of filing of the present application.

Of course, in order to improve the sealing properties of the seal according to the invention, an additional tubular section piece, made of an elastically deformable material is pierced with at least one orifice placing the inside of the section piece in communication with its outside, may abut the second section piece in a known way, on the outside thereof, in a position such that it too is compressed by the opening leaf when the latter is in the closed position, and this tubular section piece may, it too, be locally sheathed with a flexible film made of a material different than the one of which it is made, or of a similar material, but having different physical properties.

Other features and advantages of the seal according to the invention will become apparent from the detailed description which will follow of certain forms of embodiment of this seal. In this description, reference will be made to the appended schematic drawings, in which.

Figure 1:
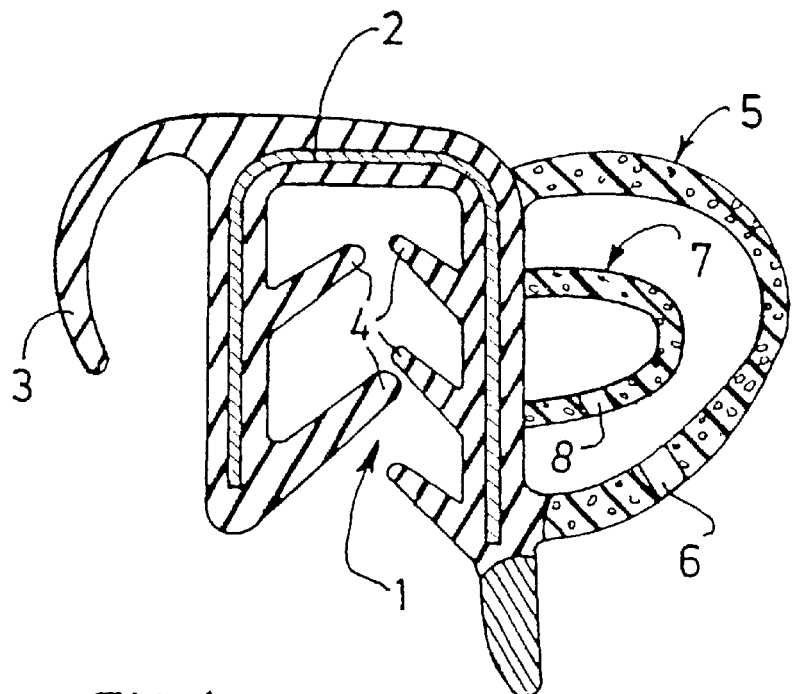
FIG. 1 is a cross section through a first form of embodiment of a seal according to the invention.

The seal depicted in FIG. 1 comprises a section piece 1 forming a clip, with a U-shaped cross section, made of elastomer or of plastomer, equipped with a metal armature 2, also with a U-shaped cross section, which here is intended to sit over a protruding edge of a motor vehicle door surround. A cosmetic lip 3 projects laterally from the base of the U, while lips 4 made of a flexible material such as an elastomer project into the U from the branches thereof, so as to firmly grip the protruding edge of the door surround.

A second section piece 5 with a U-shaped cross section, for example made of cellular rubber, inclined at roughly 90° with respect to the section piece 1, via the ends of its branches laterally abuts a flange of this section piece 1 and projects toward the outside of the vehicle on the opposite side to the lip 3, forming, with the flange of the section piece 1 which it abuts, a tubular member. This section piece 5 is intended to be compressed and deformed between the door surround and this door, when the latter is in the closed position, so as to seal the cabin of the vehicle and soundproof it, and it may be pierced with orifices 6, arranged at regular or irregular intervals along the section piece, to allow air to pass freely to the outside of the section piece or to the inside thereof.

This seal may be made in a single operation of co-extruding the section pieces 1 and 5.

According to the invention, housed inside the section piece 5 is a third section piece 7 of U-shaped cross section, of smaller size, which laterally via the ends of its branches abuts the same flange of the section piece 8 as the section piece 5. The section piece 7 has a shape roughly similar to that of the section piece 5 and its external surface here is a roughly constant distance away from the internal surface of the section piece 5. With the flange of the section piece 1 which it abuts, it forms a tubular member with a cross section appreciably smaller than that of the section piece 5.

The section piece 7 here is made of the same material as the section piece 5 and formed by co-extrusion with the latter and with the section piece 1. It too is intended to be compressed and deformed under the influence of the door, when the latter is in the closed position. To this end, as depicted in the drawing, its wall may be pierced with at least one orifice 8 placing the inside of the section piece in communication with its outside, but it may also have no such hole.

As explained hereinabove, the section piece 7 may extend over the entire length of the section piece 5 or over just part thereof, depending on the desired goal. The door compresses it only at the end of its closure movement and it offers local resistance to it, in the manner of a damper, while at the same time making the seal seal better and better soundproofing the cabin of the vehicle.

Figure 2:
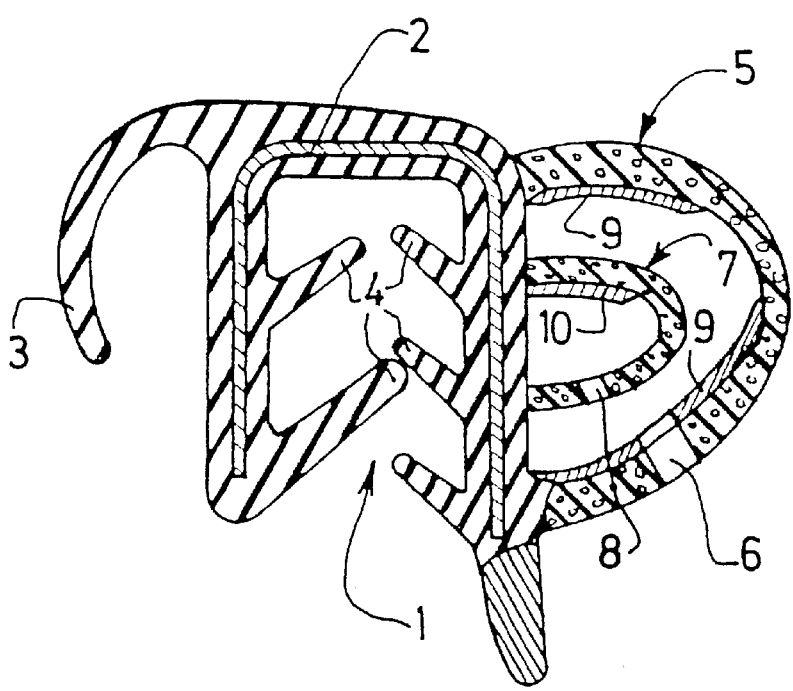
FIGS. 2 and 3 are views similar to FIG. 1 of two other forms of embodiment of the seal according to the invention.

In the embodiment of FIG. 2, in which the members which have already been described are denoted by the same reference numerals, the section pieces 5 and 7 are locally sheeted, on their internal surface, with films 9 and 10 made of a material different than that of the section piece or of a similar material but one which has different physical properties, particularly a different specific mass. These films 9 and 10, intended to form barriers against the passing of sound waves, extend over only part of the cross section and possibly over part of the length of the section pieces 7, so as only locally and to a minimum extent to disrupt the ability of these to deform.

Figure 3:
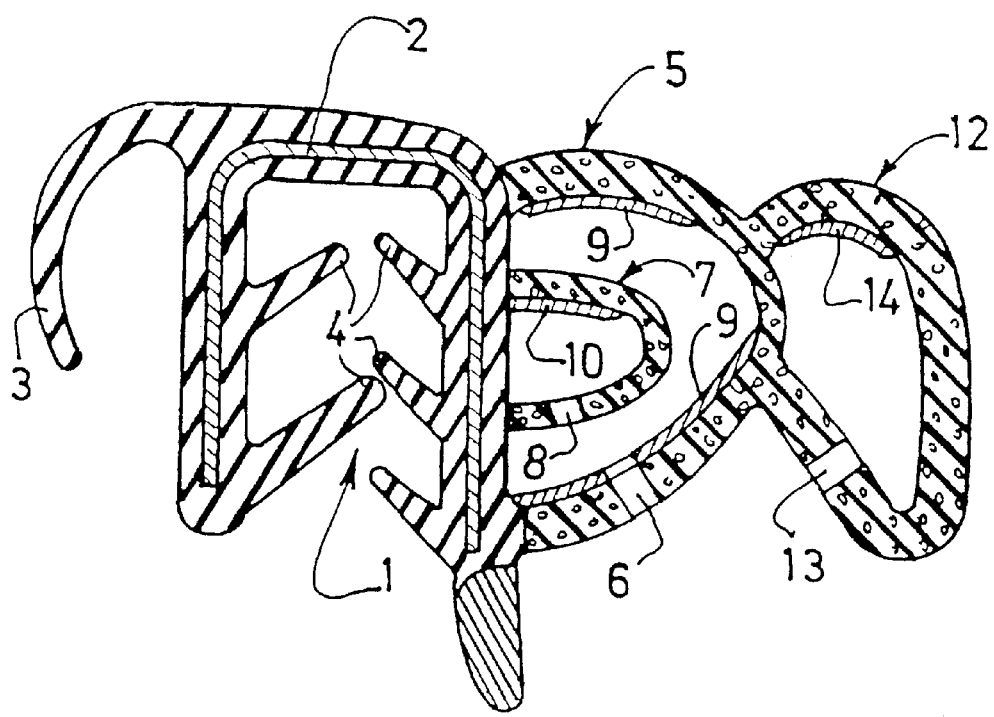

In the embodiment of FIG. 3, where the members already described are once again denoted by the same reference numerals, a tubular section piece 12, here made of the same material as the section piece 5 and communicating with the outside via orifices 13, abuts this section piece 5.

To improve the soundproofing effect of this section piece 12, also formed by co-extrusion with the section pieces 1, 5 and 7, its internal surface is locally sheathed with a film 14 made of a material different than that of which said section piece is made or similar to this material but having different physical properties, and which extends only over part of the cross section and possibly over part of the length of this section piece.

In all these embodiments, the great simplicity of the seal according to the invention will be noted, which seal may be manufactured by co-extruding all its constituent parts, except for the metal armature, using methods well known to those skilled in the art.

What is claimed is:

1. A seal for the surrounding structure of an opening formed in a motor vehicle bodywork, said seal comprising:
   (a) a first section piece (1) forming a clip of U-shaped cross-section, consisting of an elastomer or plastomer, said clip being seated over and grippingly engaging a projecting part of said surrounding structure of the opening;
   (b) a second section piece (5) of U-shaped cross-section constituted of an elastically deformable cellular material, which is coextruded with said first section piece and located at a side of the first section piece (1), such that the ends of the legs of the U-shape abut one of the legs of said first U-shaped section piece (1) so as to form a tubular member therewith, said second section piece (5) including at least one orifice (6) communicating the interior of said second section piece with the outside, said tubular member being compressible by an opening leaf operatively associated with the opening in the bodywork upon said opening leaf being moved into the closed position so as to form a seal with the surrounding structure; and
   (c) a third section piece (7) of an elastically deformable cellular material being located within the second section piece (5) and extending along at least a part of the length thereof, said third section piece (7) having a U-shaped cross-section which is smaller in size than the U-shaped second section piece (5) so as to form a space therebetween, the ends of the legs of said third section piece abutting the leg of the first section piece (1) which is abutted by the legs of the second section piece (5), and being coextruded with said first and second section pieces (1, 5), said third section piece (7) being designed to provide a localized resistance to any compressive force exerted by the opening leaf upon closing the opening of the bodywork while concurrently enhancing the sealing and soundproofing effects at the surrounding structure of the opening.

2. A seal as claimed in claim 1, wherein said third section piece (7) incorporates at least one orifice (8) communicating the interior of said third section piece (7) with the exterior thereof.

3. A seal as claimed in claim 1 or 2, wherein said second and third section pieces (5, 7) are locally sheathed on selectively the outer and inner surfaces of at least one of said section pieces with at least one film (11) comprising a soundproofing material having different physical properties than those of said second and third section pieces (5, 7), said film extending only over a portion of the U-shaped cross-sections and over a portion of the lengths of the section pieces associated therewith.

4. A seal as claimed in claim 3, wherein said film (11) is constituted of a material which is different from the cellular material of said second and third section pieces (5, 7).

5. A seal as claimed in claim 3, wherein said film (11) is constituted from the same cellular material but having different physical properties than that of said second and third section pieces (5, 7).

6. A seal as claimed in claim 1 or 2, wherein a tubular section piece (12) of an elastically deformable cellular material is arranged on the exterior surface of the second section piece (5) in a position so as to be compressed and deformed by the opening leaf upon the latter being in the closed position over the opening, said tubular section piece (12) including at least one orifice (13) communicating the interior thereof with the outside.

7. A seal as claimed in claim 6, wherein said tubular section piece (12) is locally sheathed selectively on the outer and inner surface thereof, with at least one soundproofing film (14) having different physical properties then said section piece (12), said film extending over a portion of the tubular cross-section and over a portion of the length of the tubular third section piece (12).

8. A seal as claimed in claim 7, wherein said film (11) is constituted of a material, which is different from the cellular material of said second and third section pieces (5, 7).

9. A seal as claimed in claim 7, wherein said film (11) is constituted from the same cellular material but having different physical properties than that of said second and third section pieces (5, 7).

10. A seal as claimed in claim 6, wherein said first section piece forming the clip (1), said second section piece (5), said third section piece (7), said tubular section piece (12) and therewith associated films (9, 10, 14) are formed by coextrusion.

11. A seal as claimed in claim 10, wherein said section pieces (5, 7, 12) are each constituted of cellular rubber.

* * * * *